US012679692B2

(12) United States Patent
Kimura et al.

(10) Patent No.: US 12,679,692 B2
(45) Date of Patent: Jul. 14, 2026

(54) ELEVATOR CONTROL DEVICE

(71) Applicant: Mitsubishi Electric Corporation, Tokyo (JP)

(72) Inventors: Tetsuya Kimura, Tokyo (JP); Eiji Yokoyama, Tokyo (JP); Toshiyuki Baba, Tokyo (JP); Yasushi Otsuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1204 days.

(21) Appl. No.: 17/431,431

(22) PCT Filed: Mar. 29, 2019

(86) PCT No.: PCT/JP2019/013995
§ 371 (c)(1),
(2) Date: Aug. 17, 2021

(87) PCT Pub. No.: WO2020/202249
PCT Pub. Date: Oct. 8, 2020

(65) Prior Publication Data

US 2022/0135367 A1 May 5, 2022

(51) Int. Cl.
*B66B 1/30* (2006.01)
*B66B 1/32* (2006.01)

(52) U.S. Cl.
CPC ................ *B66B 1/304* (2013.01); *B66B 1/32* (2013.01)

(58) Field of Classification Search
CPC .................................. B66B 1/304; B66B 1/32
See application file for complete search history.

(56) References Cited

U.S. PATENT DOCUMENTS 4,337,848 A * 7/1982 Kindler ..................... B66B 1/32 187/292
4,852,694 A 8/1989 Arabori et al.
(Continued)

FOREIGN PATENT DOCUMENTS

CN 104520223 B * 3/2016 ............. B66B 1/308
CN 105775948 A * 7/2016
(Continued)

OTHER PUBLICATIONS

Indian Office Action issued Mar. 8, 2022, in Indian Application No. 202147038210.
(Continued)

*Primary Examiner* — Shawki S Ismail
(74) *Attorney, Agent, or Firm* — XSENSUS LLP

(57) ABSTRACT

Proposed is an elevator control device in which an unbalance torque estimation unit configured to estimate an unbalance torque in a motor is implemented in accordance with such a new finding that the unbalance torque can be estimated based on a first time period from an output change of a brake state command signal for switching an operation state of a brake from a braking state to a releasing state to a time when the motor starts a rotating operation along with release of the brake, and on a positive or negative sign of a velocity signal obtained when the motor starts rotation. As a result, as compared to the related art, a smaller calculation load can be achieved. Further, the elevator control device can have a sufficient responsiveness for suppressing an influence of the unbalance torque.

16 Claims, 11 Drawing Sheets

(56) References Cited

U.S. PATENT DOCUMENTS

| | | | | | |
|---|---|---|---|---|---|
| 5,067,593 | A * | 11/1991 | Tanaka | B66B 1/28 477/29 |
| 5,076,399 | A * | 12/1991 | Horbruegger | B66B 1/304 187/293 |
| 5,441,127 | A * | 8/1995 | Ikejima | B66B 1/44 181/292 |
| 2016/0214833 | A1* | 7/2016 | Kattainen | B66B 5/0037 |
| 2022/0135367 | A1* | 5/2022 | Kimura | B66B 1/304 187/289 |

FOREIGN PATENT DOCUMENTS

| | | | | | |
|---|---|---|---|---|---|
| CN | 105775948 | B * | 1/2018 | |
| JP | 50-149040 | A | 11/1975 | |
| JP | 4727234 | B2 * | 7/2011 | |
| JP | 2016-183048 | A | 10/2016 | |
| WO | WO-2005102895 | A1 * | 11/2005 | B66B 1/285 |
| WO | WO-2018003500 | A1 * | 1/2018 | B66B 1/30 |
| WO | 2018/042920 | A1 | 3/2018 | |

OTHER PUBLICATIONS

International Search Report and Written Opinion mailed on Jun. 4, 2019, received for PCT Application PCT/JP2019/013995, Filed on Mar. 29, 2019, 9 pages including English Translation.

* cited by examiner

CORRECTION TORQUE FUNCTION WHEN ROTATING DIRECTION INFORMATION IS NEGATIVE [Nm]

CORRECTION TORQUE FUNCTION WHEN ROTATING DIRECTION INFORMATION IS POSITIVE [Nm]

(a) ENCODER OUTPUT EXAMPLE WHEN ROTATING DIRECTION IS POSITIVE ROTATION (b) ENCODER OUTPUT EXAMPLE WHEN ROTATING DIRECTION IS NEGATIVE ROTATION

ELEVATOR CONTROL DEVICE

CROSS-REFERENCE TO RELATED APPLICATION

The present application is based on PCT filing PCT/JP2019/013995, filed Mar. 29, 2019, the entire contents of which are incorporated herein by reference.

TECHNICAL FIELD

The present invention relates to an elevator control device configured to reduce abrupt state variations of a car of an elevator, which occur when running of the elevator is started.

BACKGROUND ART

In a general rope-type elevator, a car and a counterweight are each suspended by a rope in a traction system with respect to a sheave. This configuration causes a problem in that, when running of the elevator is started, the car and the counterweight are unbalanced in weight. When the car stays at a landing floor, the car is kept under a stationary state through use of a brake. Then, when the running of the car is to be started, an elevator control device first releases the brake. Next, after the brake is released, a motor rotates the sheave, and thus the car starts a running operation. At the timing at which the brake is released, abrupt state variations of the car are liable to occur. Accordingly, from the viewpoint of ride comfort of passengers, in the elevator control device, hitherto, countermeasures against the abrupt state variations of the car have been taken. Examples of the abrupt state variations of the car include acceleration variations of the car and position variations of the car. In the following, the acceleration variations of the car are referred to as “start shock”. Further, the position variations of the car are referred to as “rollback”.

It is well known that the abrupt state variations of the car are caused by an unbalance torque in the motor due to a weight difference between the car and the counterweight. This unbalance torque acts as a stepped input disturbance to the motor along with the brake release, thereby causing the abrupt state variations of the car. In view of the above, a related-art elevator control device adopts the following system (see, for example, Patent Literature 1). That is, the elevator control device detects a load weight of the car through use of a scale being a load detection device, and first estimates an unbalance torque at this time. Next, the elevator control device causes the motor to generate a torque for canceling the estimated unbalance torque, and then releases the brake. With this system, the abrupt state variations of the car are prevented from occurring even immediately after the brake is released. However, this system requires the load detection device. Therefore, there has been a problem of an increase in cost. Further, at the time of installation of the elevator, work related to mounting and adjusting of the load detection device is required, and hence there has been a problem of a further increase in cost. The system described here is called a scale start-up system because a scale is used for the start-up.

In view of the above, in recent years, as a different related-art elevator control device, there has been newly proposed a control system implemented by software without using a load detection device (see, for example, Patent Literature 2). The related-art elevator control device disclosed in Patent Literature 2 adopts a control system configured to estimate an unbalance torque through use of a control theory called a disturbance observer, and to compensate for the estimated unbalance torque.

However, the related-art elevator control device disclosed in Patent Literature 2 has the following problems. That is, the disturbance observer is used as a method of estimating the unbalance torque, and hence there has been a problem in that a calculation load of computing means, for example, a microcomputer, is increased when the disturbance observer is calculated. Further, the control performance for suppressing an influence of the unbalance torque is limited by a bandwidth determined by a frequency characteristic of the disturbance observer. Therefore, there have been problems in that the elevator control device cannot have a sufficient responsiveness for suppressing the influence of the unbalance torque, and in some cases, a required specification regarding the responsiveness cannot be satisfied.

CITATION LIST

Patent Literature

[PTL 1] JP 50-149040 A
[PTL 2] WO 2018/003500 A1

SUMMARY OF INVENTION

Technical Problem

The present invention has been made to solve the above-mentioned problems. The present invention has an object to provide an elevator control device with which, in an elevator control device configured to compensate for an unbalance torque through use of an unbalance torque estimation unit configured to estimate an unbalance torque in a motor without using a load detection device, unbalance torque estimation computation in the unbalance torque estimation unit can be implemented with a smaller calculation load of computing means, for example, a microcomputer, as compared to the related art. Further, the present invention has another object to provide an elevator control device having a sufficient responsiveness for suppressing an influence of the unbalance torque.

Solution to Problem

According to one embodiment of the present invention, there is provided an elevator control device including: a current detection unit configured to detect a drive current of a motor configured to drive a sheave to rotate, the sheave having a rope looped therearound, the rope suspending, on one side and the other side thereof, a car and a counterweight, respectively, through intermediation of the sheave; a velocity computation unit configured to compute a velocity signal of the motor based on output of a rotation amount detection unit configured to detect a rotation amount of the motor; a velocity command generation unit configured to generate a velocity command signal for the motor; a velocity control unit configured to output, based on the velocity command signal and the velocity signal, a velocity control signal which is a possible torque current command signal so that the velocity signal follows the velocity command signal, to thereby control a velocity of the motor; a current control unit configured to drive the motor so that the drive current follows a torque current command signal input thereto; a brake control unit configured to control switching between a releasing state and a braking state of a brake configured to brake a rotation of the motor; a brake state command generation unit configured to output, to the brake control unit, a brake state command signal for switching between the releasing state and the braking state of the brake; an unbalance torque estimation unit configured to estimate an unbalance torque in the motor caused by a weight difference between the car and the counterweight based on, as two pieces of information in zero velocity control of controlling the velocity of the motor with the velocity command signal being set to zero, a first time period from an output change of the brake state command signal for switching an operation state of the brake from the braking state to the releasing state to a time when the motor starts a rotating operation along with release of the brake, and a positive or negative sign of the velocity signal obtained when the motor starts the rotating operation, and to output an unbalance torque estimation signal being an estimation result; and an addition unit configured to output, to the current control unit, a torque current command signal corrected by adding the unbalance torque estimation signal to the velocity control signal which is output from the velocity control unit, and is the possible torque current command signal.

Advantageous Effects of Invention

The present invention is made in accordance with such a new finding obtained this time that the elevator control device according to the present invention, in particular, the unbalance torque estimation unit can estimate the unbalance torque based on the first time period from the output change of the brake state command signal for switching the brake operation state from the braking state to the releasing state to the time when the motor starts the rotating operation along with the release of the brake, and on the positive or negative sign of the velocity signal obtained when the motor starts the rotation. Thus, according to the elevator control device of the present invention, there is provided such an effect that the unbalance torque estimation computation can be implemented with a smaller calculation load of the computing means, for example, the microcomputer, as compared to the related art. Further, there is provided such another effect that the elevator control device of the present invention can have a sufficient responsiveness for suppressing the influence of the unbalance torque.

DESCRIPTION OF EMBODIMENTS

Now, an elevator control device according to the present invention is described with reference to the accompanying drawings by means of embodiments. In the embodiments and the drawings, the same or corresponding parts are in principle denoted by the same reference symbols, and overlapping description is simplified or omitted as appropriate. The present invention is not limited to the following first or second embodiment, and various modifications can be made thereto without departing from the technical idea of the present invention.

First Embodiment

Figure 1:
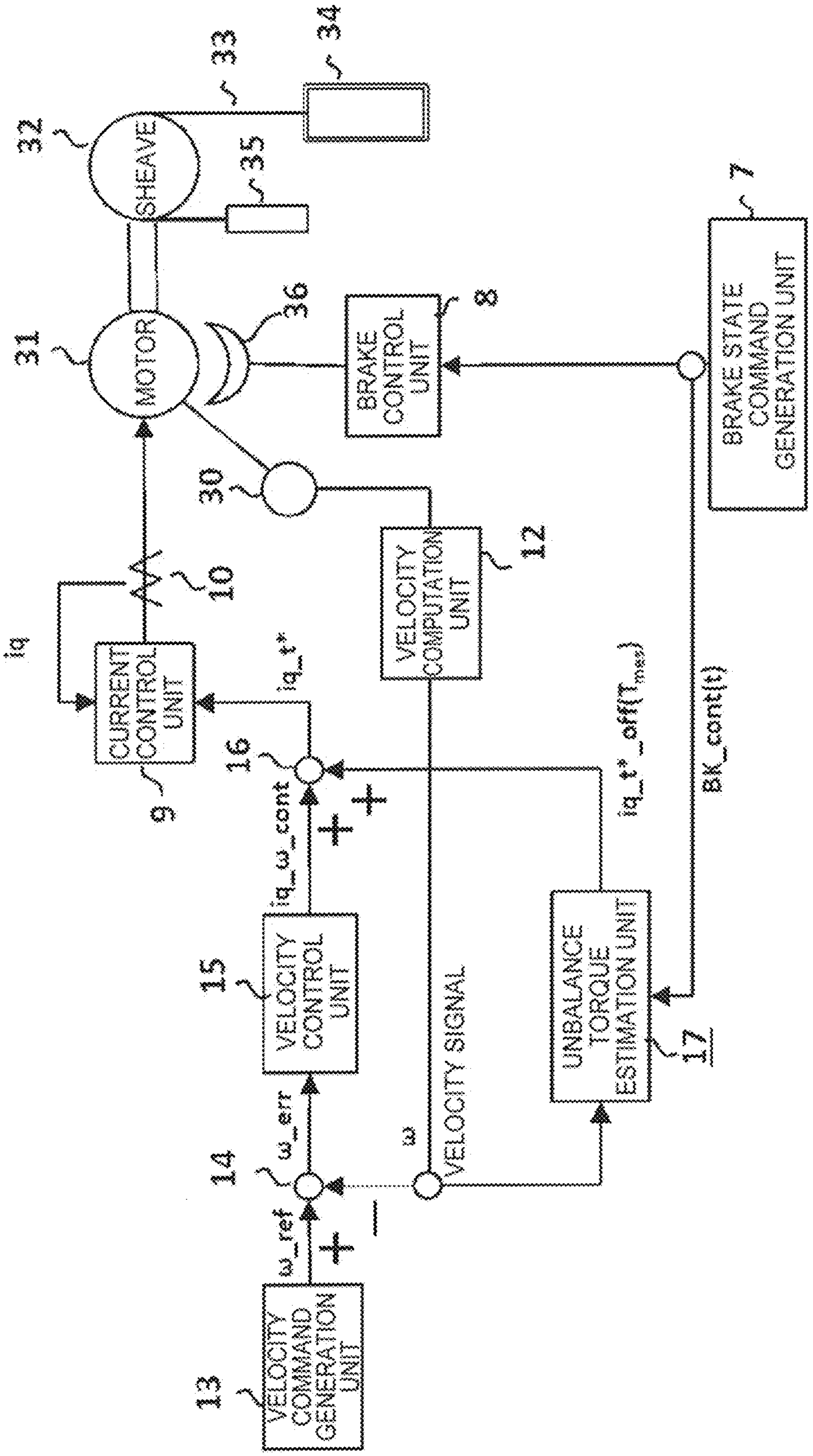
FIG. 1 is a diagram for illustrating a configuration of an elevator control device according to a first embodiment of the present invention.

FIG. 1 is a diagram for illustrating a configuration of an elevator control device according to a first embodiment of the present invention. A sheave 32 is connected to a rotary shaft of a motor 31. A rope 33 is looped around the sheave 32. The rope 33 has one end connected to a car 34, and the other end connected to a counterweight 35. As a result, the car 34 and the counterweight 35 are suspended through use of the rope 33 in a traction system with respect to the sheave 32. The rope 33 is not limited to a rope having a circular cross section, and includes, for example, a rope having a belt shape. An encoder 30 configured to detect an angle is connected to the motor 31 to which the sheave 32 is connected. With this encoder 30, angle information related to a rotational angle of the motor 31 can be obtained. A velocity control system is formed based on this angle information.

Figure 2:
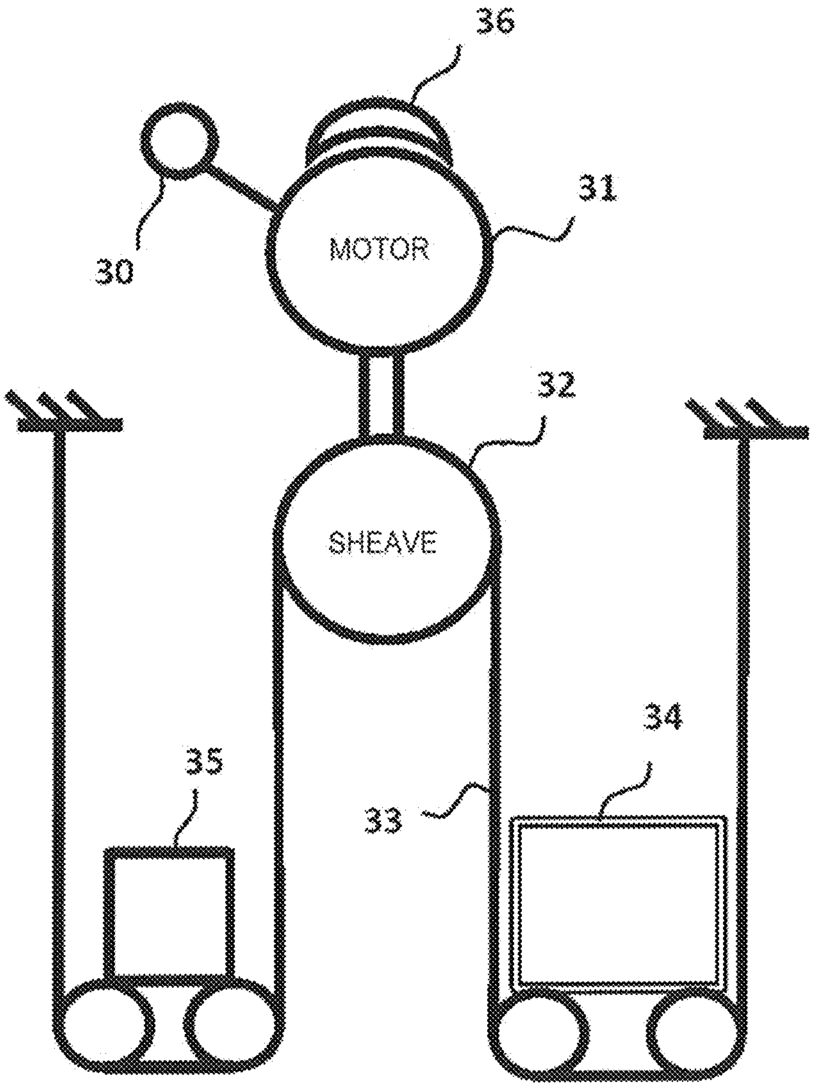
FIG. 2 is a view for illustrating a configuration of a case of a 2:1 roping system as an example of an elevator mechanical system to be controlled by the elevator control device according to the first embodiment of the present invention.

In this case, an elevator mechanical system is formed of components denoted by reference symbols 30 to 36. The elevator mechanical system illustrated in FIG. 1 has a configuration called a 1:1 roping system. Meanwhile, in the elevator control devices according to the elevator control devices according to the first embodiment and a second embodiment to be described later of the present invention, the elevator mechanical system to be controlled by the elevator control device may be, other than the 1:1 roping system illustrated in FIG. 1, for example, an n:1 roping system (provided that n≥2). As a reference, FIG. 2 shows an elevator mechanical system having a configuration called a 2:1 roping system. It should be noted that, in the case of the n:1 roping system (provided that n≥2), for example, an influence of the weight of the car 34 including an in-car load on a motor torque becomes 1/n as compared to the 1:1 roping system. However, it is apparent that a basic part of the technical contents to be described for the case of the 1:1 roping system below can be similarly applied also to the case of the n:1 roping system.

Now, details of the velocity control system are described with reference to FIG. 1. A motor angle detection signal corresponding to the angle information being the output of the encoder 30 is input to a velocity computation unit 12. The velocity computation unit 12 has a function of converting the motor angle detection signal into an angular velocity signal of the motor 31, and outputs a velocity signal ω. Processing of subtracting the velocity signal ω from a velocity command signal ω_ref being the output of a velocity command generation unit 13 is performed by a subtraction unit 14 to obtain a velocity deviation signal ω_err. The velocity deviation signal ω_err is input to a velocity control unit 15 configured so that desired following performance can be obtained through velocity control. For example, the velocity control unit 15 is implemented by typical PID control. In this case, the velocity control unit 15 outputs a velocity control signal iq_ω_cont being a result of subjecting the velocity deviation signal ω_err to proportional-integral-differential operation.

An addition unit 16 adds the velocity control signal iq_ω_cont and an unbalance torque estimation signal iq_t*_off(Tmes) to be described later, and outputs a torque current command signal iq_t* being a result of the addition. This unbalance estimation signal iq_t*_off(Tmes) is output from an unbalance torque estimation unit 17. As already described here, the unbalance torque estimation signal is written as iq_t*_off. As is made clear later, the unbalance torque estimation signal is dependent on Tmes being the time information serving as a parameter, and hence is represented by iq_t*_off(Tmes). This information Tmes corresponds to information related to a time period referred to as "first time period" to be described later. The torque current command signal iq_t* is input to a current control unit 9. The current control unit 9 performs control so that a motor drive current signal "iq" from a current detection unit 10 follows the torque current command signal iq_t* input thereto. Accordingly, the current control unit 9 normally outputs, to the motor 31, a drive current "iq" that matches the torque current command signal iq_t*.

As a reference, when the value of the unbalance estimation signal iq_t*_off(Tmes) being the output of the unbalance torque estimation unit 17 is zero, as a matter of course, the torque current command signal iq_t* to be input to the current control unit 9 matches the velocity control signal iq_ω_cont being the output of the velocity control unit 15. Similarly, when there is no unbalance torque estimation unit 17 as in the related-art elevator control device, the torque current command signal iq_t* matches the velocity control signal iq_ω_cont.

With the configuration described above, the velocity control system is implemented so that the velocity ω of the motor 31 follows the velocity command signal ω_ref. The velocity signal and the velocity command signal described here are signals related to angles, and hence, strictly speaking, are required to be referred to as "angular velocity signal" and "angular velocity command signal," respectively. However, unless no misunderstanding of those signals occurs, for the sake of convenience, the signals are referred to as "velocity signal" and "velocity command signal" herein.

A brake 36 has two operation states of braking and canceling of the braking with respect to the motor 31. In the following, the canceling of the braking is simply referred to as "release". A brake control signal BK_cont output from a brake state command generation unit 7 is given to a brake control unit 8, thereby being capable of switching between a braking state and a releasing state of the brake 36. When the car 34 is moved from a current floor to a target floor, the operation state of the brake 36 is required to be changed in advance from the braking state for immobilizing the car 34 to the releasing state. At this time of brake release, the velocity control system described above is changed from a disabled state to an enabled state. Then, the velocity command generation unit 13 sets the velocity command signal ω_ref in the enabled state to zero. Incidentally, velocity control of controlling the velocity of the motor 31 with the velocity command signal being set to zero is referred to as "zero velocity control" herein.

The unbalance torque estimation unit 17 is configured to estimate the unbalance torque in the motor 31 caused by a weight difference between the car 34 and the counterweight 35. A control system of canceling the unbalance torque is implemented through use of the unbalance torque estimation signal iq_t*_off(Tmes) estimated and output by the unbalance torque estimation unit 17. When the unbalance torque can be canceled, a stepped input disturbance to the motor 31 is not generated. At the time of brake release, the sheave 32 and the car 34 do not move and are in a stable state, and hence occurrence of start shock and rollback can be suppressed.

Now, details of the unbalance torque estimation unit 17 are described. Before the configuration of the unbalance torque estimation unit 17 is described, in order to give priority to facilitating the understanding of the points of the present invention, now, how to obtain the unbalance torque estimation signal in the unbalance torque estimation unit 17 is first described with reference to FIG. 3.

Figure 3:
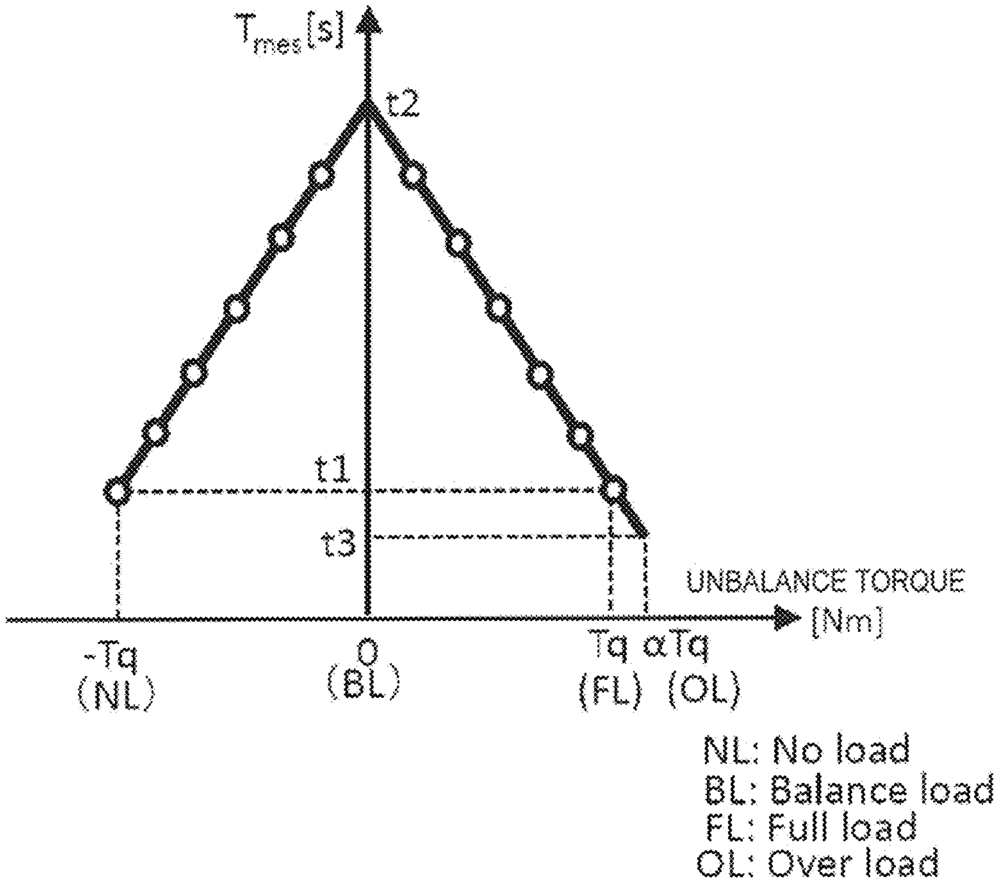
FIG. 3 is a graph for showing a relationship between an unbalance torque and time information determined based on a certain definition.
Figure 11:
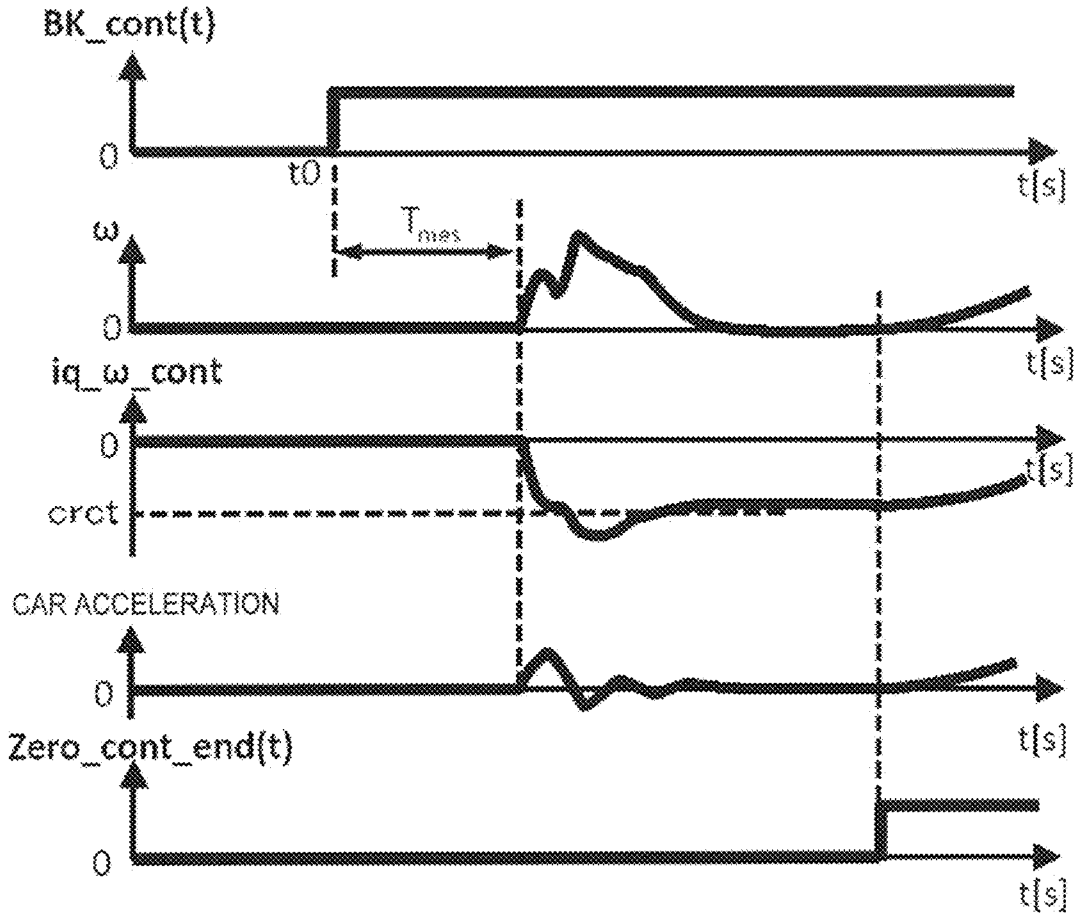
FIG. 11 shows examples of time waveform charts of various signals obtained when a brake characteristic is changed in a case in which there is no in-car load and there is also no start shock suppression control.

As illustrated in FIG. 1, the unbalance torque estimation unit 17 has a function of receiving the velocity signal ω and the brake control signal BK_cont as input, and outputting the unbalance torque estimation signal iq_t*_off(Tmes). The specific technical feature of the elevator control devices according to the first embodiment and the second embodiment to be described later of the invention resides in that there is utilized a new finding that the unbalance torque estimation signal, which is required for canceling the unbalance torque, can be easily obtained through use of signals of the velocity signal ω and the brake control signal BK_cont. The feature appears in data shown in FIG. 3. FIG. 3 is a graph for showing a relationship between the unbalance torque and time information determined based on a certain definition. This time information determined based on a certain definition refers to a time period from an output change of the brake state command signal for switching the operation state of the brake 36 from the braking state to the releasing state to the time when the operation state of the brake 36 is switched from the braking state to the releasing state so that the motor 31 starts the rotating operation. This time information is simply referred to as "first time period Tmes" herein. As a reference, the time period corresponding to the first time period Tmes is written in FIG. 11 to be referred to later. FIG. 11 shows examples of time waveform charts of various signals obtained when a brake characteristic is changed in a case in which there is no in-car load and there is also no start shock suppression control. As mentioned earlier, the first time period Tmes is, as illustrated in FIG. 11, a time period from the output change of the brake state command signal for switching the operation state of the brake 36 from the braking state to the releasing state to the time when the operation state of the brake 36 is switched from the braking state to the releasing state so that the motor 31 starts the rotating operation.

Then, FIG. 3 shows, more specifically, the relationship between the unbalance torque [Nm] and the first Tmes [s] based on actually measured data. The horizontal axis indicates the unbalance torque, and the vertical axis indicates the first time period Tmes. The domain on the horizontal axis is from −Tq to $\alpha$Tq. Symbol $\alpha$Tq represents a value obtained by multiplying Tq by $\alpha$. In this case, Tq represents an unbalance torque amount obtained when a rated load amount is mounted, and $\alpha$ represents a ratio of a load limit amount to the rated load amount.

Points of black circles of FIG. 3 indicate actually measured data. FIG. 3 is created by performing experiments of stacking weights in the car 34 to change the load in the car 34, and plotting the relationship between the unbalance torque and the first time period Tmes at those times.

Incidentally, in FIG. 3, a case in which the unbalance torque is −Tq corresponds to a case referred to as "no load (NL)" in which no weight is loaded in the car 34. Further, a case in which the unbalance torque is $\alpha$Tq corresponds to a case referred to as "over load (OL)" in which the load amount is the limit load amount.

In FIG. 3, values t1, t2, and t3 [s] of the first time period Tmes represent the following. Symbol t1 represents a value of the first time period Tmes obtained when the loading amount of the car 34 is the rated load amount. Symbol t2 represents a value of the first time period Tmes obtained when the loading amount of the car 34 is a balance load amount (amount balancing with the counterweight 35). Symbol t3 represents a value of the first time period Tmes obtained when the loading amount of the car 34 is the load limit amount.

In this case, according to our experiments, from the plotted actually measured data, we have succeeded in newly recognizing this time that, as shown in FIG. 3, there is a relationship that can exhibit linear approximation at a certain high degree of accuracy, and further that this relationship has reproducibility. That is, it can be recognized that the characteristic waveform indicated by the solid line of FIG. 3 can be approximated to a linear function having the unbalance torque on the horizontal axis and the first time period Tmes on the vertical axis, and is a characteristic that is line symmetric with respect to the vertical axis expect for a range of from Tq to $\alpha$Tq in the domain on the horizontal axis.

It should be noted that, as a reference, the symbols used in the description of FIG. 3 above have the same meanings as those of the symbols of FIG. 5 and FIG. 6 to be described later.

Further, it can be recognized that there is achieved a relationship in which, as an absolute amount of the unbalance torque is increased, the value of the first time period Tmes is reduced as a linear function.

In this case, the point of FIG. 3 indicating t2 [s] at which the first time period Tmes is the maximum value represents the first time period Tmes obtained when the unbalance torque is zero, that is, a balance is achieved. However, the point indicating t2 [s] is an imaginarily point obtained through linear approximation. This is apparent from the fact that, when the unbalance torque is completely zero, that is, a balance is achieved, the first time period Tmes should normally be an infinite time period.

The characteristic waveform indicated by the solid line of FIG. 3 has been described so far so as to be a linear function having the unbalance torque on the horizontal axis and the first time period Tmes on the vertical axis. Otherwise, it is apparent that, within an allowable accuracy, as a matter of course, for example, the characteristic waveform may be a monotonically increasing function when the domain on the horizontal axis is negative and a monotonically decreasing function when the domain on the horizontal axis is positive. That is, it can be said that the characteristic waveform described here is only required to be, in general, a one-to-one correspondence function. The one-to-one correspondence function refers to a function having a feature in that the value on the vertical axis uniquely corresponds to the value on the horizontal axis, and the value on the horizontal axis uniquely corresponds to the value on the vertical axis.

Then, it is understood from FIG. 3 that the unbalance torque can be estimated when the value of the first time period Tmes [s] and whether the sign of the unbalance torque is positive or negative are known. In this case, the first time period Tmes [s] can be measured. Further, whether the sign of the unbalance torque is positive or negative can be determined based on the positive or negative sign of the velocity signal $\omega$ obtained when the motor 31 starts the rotating operation along with the release of the brake 36. Accordingly, it is apparent from FIG. 3 that the unbalance torque can be estimated through use of those two pieces of information.

As described above, the elevator control devices according to the first embodiment and the second embodiment to be described later of the present invention are implemented by utilizing the fact that the unbalance torque in the motor 31 caused by the weight difference between the car 34 and the counterweight 35 can be estimated based on, as the two pieces of information in the zero velocity control of controlling the velocity of the motor 31 with the velocity command signal being set to zero, the first time period from the output change of the brake state command signal for switching the operation state of the brake 36 from the braking state to the releasing state to the time when the motor 31 starts the rotating operation along with the release of the brake 36, and the positive or negative sign of the velocity signal obtained when the motor 31 starts the rotating operation.

In this case, the timing at which the motor 31 starts the rotating operation along with the release of the brake 36 is also, as a physical meaning, the timing at which the operation state of the brake 36 changes from a static friction state to a dynamic friction state, and hence can be also said to be a brake state change timing. Accordingly, when the definition of the first time period Tmes is described in other words, the first time period Tmes refers to a time period from a brake release command being a brake state command to the brake state change timing. At this time, it is understood that such information inside the brake 36 that the brake 36 is in the static friction state indicates, as external information, a state in which the velocity signal ω is zero. Further, it is understood that the brake state change timing which is the timing at which the state inside the brake 36 changes from the static friction state to the dynamic friction state indicates, as external information, the timing of a change from the state in which the velocity signal ω is zero to a state in which the velocity signal ω has a value other than zero.

Accordingly, the brake state change timing can be detected as a result as, as the external information, the timing at which the motor 31 starts the rotating operation along with the release of the brake 36.

Description has been given above of how to obtain the unbalance torque estimation signal in the unbalance torque estimation unit 17. Next, with reference to FIG. 4, the internal configuration of the unbalance torque estimation unit 17 is described.

Figure 4:
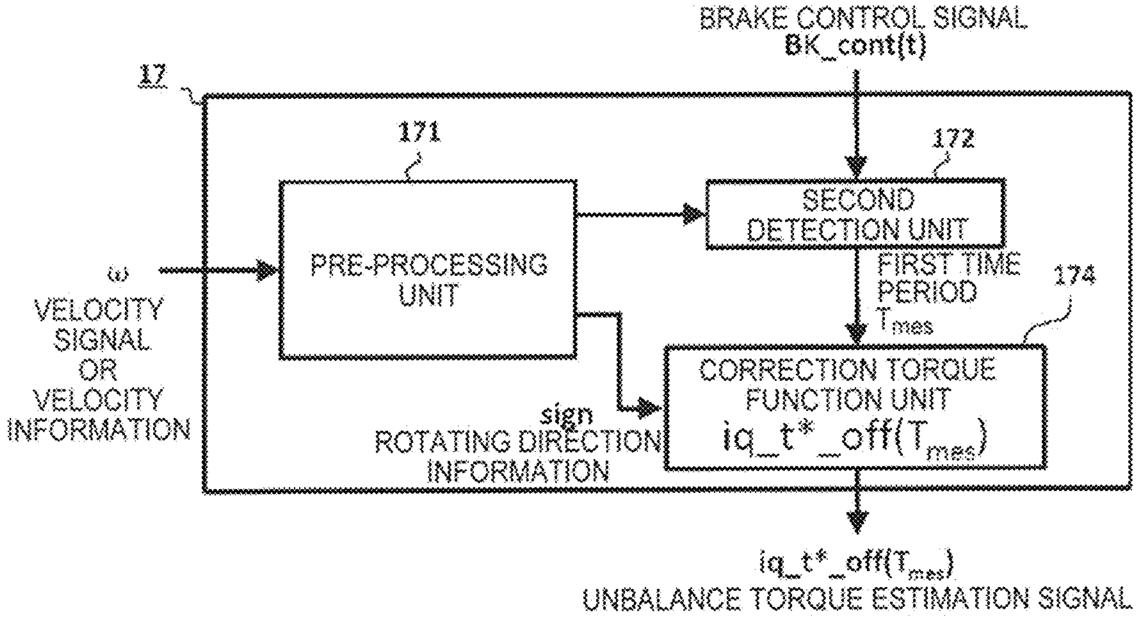
FIG. 4 is a configuration diagram of an unbalance torque estimation unit in the elevator control device according to the first embodiment of the present invention.

FIG. 4 is a configuration diagram of the unbalance torque estimation unit 17 in the elevator control device according to the first embodiment of the present invention. As illustrated in FIG. 4, the unbalance torque estimation unit 17 includes a pre-processing unit 171, a second detection unit 172, and a correction torque function unit 174.

In FIG. 4, the pre-processing unit 171 includes a first detection unit (not shown) and a first determination unit (not shown). The first detection unit (not shown) is configured to detect the brake state change timing. The first determination unit (not shown) is configured to determine whether the sign of the unbalance torque is positive or negative. The second detection unit 172 is configured to detect the first time period Tmes being the time period from the brake release command to the brake state change timing. The correction torque function unit 174 is configured to establish a relationship based on a correction torque function.

Further, ω to be input to the unbalance torque estimation unit 17 may be a normal velocity signal representing a physical quantity of velocity. Otherwise, for example, ω may be velocity information formed of two signals of A-phase output and B-phase output corresponding to incremental encoder output. In the following, description is first given assuming that ω to be input is a velocity signal.

The velocity signal ω is input to the pre-processing unit 171 including the first detection unit (not shown) and the first determination unit (not shown). The first detection unit is configured to detect the brake state change timing. For example, the first detection unit detects the timing at which the input velocity signal ω changes from zero to a predetermined value other than zero, and outputs a brake state change timing detection signal indicating that the brake state change timing is detected. As described above, the brake state change timing can be detected as, as the external information, the timing at which the motor 31 starts the rotating operation along with the release of the brake 36. Accordingly, a detection method for the brake state change timing may use the timing at which a change indicating the rotating operation of the motor 31 appears in, other than the velocity signal ω described here, for example, at least one of an output signal of the rotation amount detection unit 30, the velocity control signal output from the velocity control unit 15, the drive current signal "iq" which can be obtained from the current detection unit 10, or the torque current command signal iq_t* input to the current control unit 9.

The second detection unit 172 is configured to detect the first time period Tmes. As the first time period Tmes, the second detection unit 172 detects a time period from, as a starting point, the timing of the brake release command that is based on the brake control signal BK_cont, to the detection time of the brake state change timing detection signal. The first determination unit is configured to determine whether the sign of the unbalance torque is positive or negative. More accurately, the first determination unit determines whether the sign of the velocity signal ω is positive or negative at the time point at which the brake state change timing detection signal changes. Specifically, the first determination unit is configured to determine the rotating direction of the motor 31 at the time when the operation state of the brake 36 is changed from the static friction state to the dynamic friction state, and to output rotating direction information "sign". The rotating direction information "sign" is output as +1 or −1 in accordance with whether the rotating direction is a positive rotation or a negative rotation. Further, more accurately, the rotating direction information "sign" is output as zero when the rotating direction is zero, that is, when no rotation is achieved. The correction torque function unit 174 receives the first time period Tmes and the rotating direction information "sign" as input, to thereby output the unbalance torque estimation signal iq_t*_off (Tmes) based on the positive or negative sign of the rotating direction information. The correction torque function unit 174 is a function dependent on the rotating direction of the motor 31 at the time when the operation state of the brake 36 is changed from the static friction state to the dynamic friction state. FIG. 5 and FIG. 6 show the characteristic of the correction torque function unit 174.

Description has been given above of the case in which co to be input to the unbalance torque estimation unit 17 is a velocity signal. Next, with reference to FIG. 7, description is given of the pre-processing unit 171 in the unbalance torque estimation unit 17 as a case in which ω to be input to the unbalance torque estimation unit 17 is velocity information formed of two signals of A-phase output and B-phase output corresponding to the incremental encoder output. The second detection unit 172 and the correction torque function unit 174 are the same as the contents described above as the case in which ω to be input is a velocity signal, and hence description thereof is omitted here.

Figure 7:
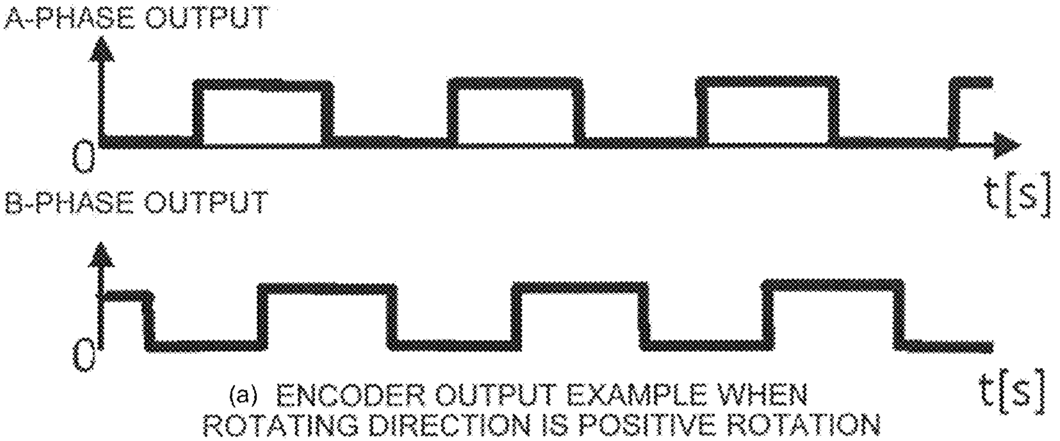
FIG. 7 shows time waveform charts of a case in which input co of the unbalance torque estimation unit is incremental encoder output being velocity information.
Figure 7:
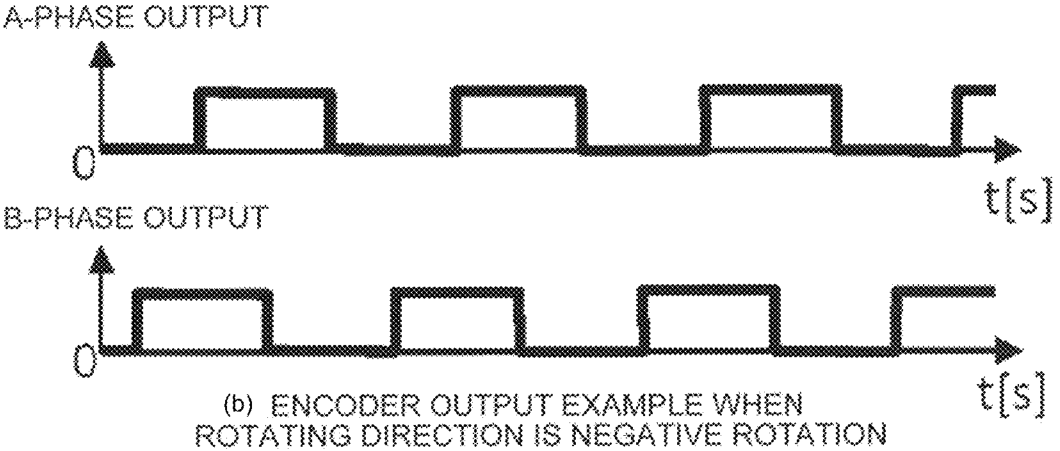

As illustrated in FIG. 7, ω to be input to the unbalance torque estimation unit 17 is assumed to be velocity information formed of two signals of A-phase output and B-phase output corresponding to the incremental encoder output. At this time, it is well known that the signal of the A-phase output and the signal of the B-phase output have a relationship of being shifted in phase by 90 degrees.

Then, similarly to the contents described above as the case in which ω is a velocity signal, the pre-processing unit 171 includes the first detection unit (not shown) configured to detect the brake state change timing and the first determination unit (not shown) configured to determine whether the sign of the unbalance torque is positive or negative. In view of this, the first detection unit detects the brake state change timing based on the time when a change appears in the two signals of the A-phase output and the B-phase output because the motor 31 starts the rotating operation along with the brake release caused by the brake state command for switching the operation state of the brake 36 from the braking state to the releasing information. As already described above, the brake state change timing can be detected as, as the external information, the timing at which the motor 31 starts the rotating operation along with the release of the brake 36. Accordingly, another detection method for the brake state change timing may use the timing at which a change indicating the rotating operation of the motor 31 appears in, for example, at least one of the velocity control signal output from the velocity control unit 15, the drive current signal "iq" which can be obtained from the current detection unit 10, or the torque current command signal iq_t* input to the current control unit 9.

Further, the first determination unit can distinguish the rotating direction of the encoder, that is, the rotating direction of the motor 31 connected to the encoder based on which of the rising timing of the signal of the A-phase output or the signal of the B-phase output comes earlier, and thus determines whether the unbalance torque sign is positive or negative. The upper diagram of FIG. 7 shows the incremental encoder output when the rotating direction of the encoder is a positive rotation. Further, the lower diagram thereof shows the incremental encoder output when the rotating direction of the encoder is a negative rotation.

Figure 5:
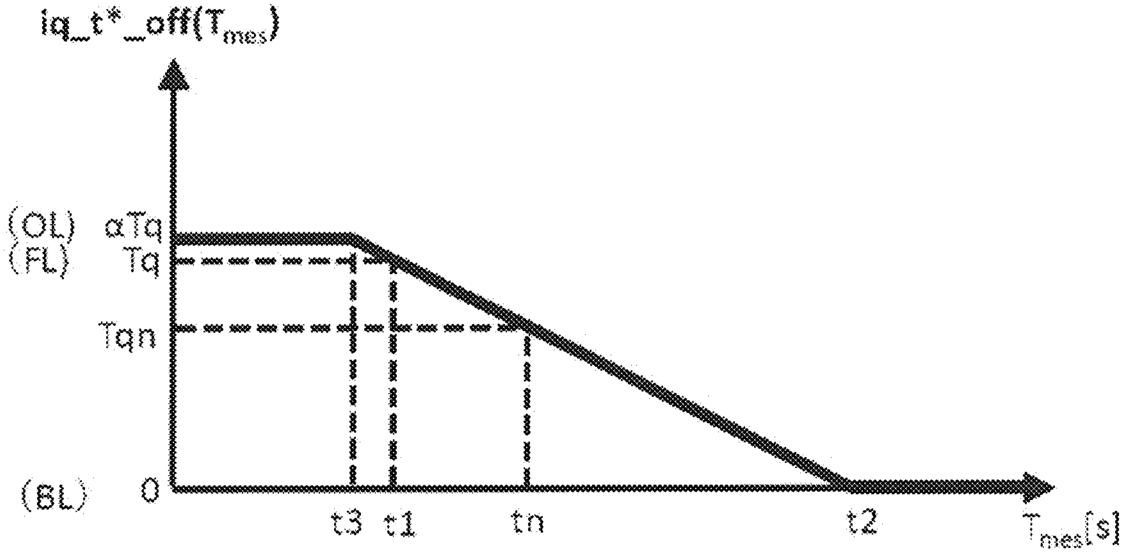
FIG. 5 shows a correction torque function (to be used when a rotating direction is negative) which is an element forming the unbalance torque estimation unit in the elevator control device according to the first embodiment of the present invention.
Figure 6:
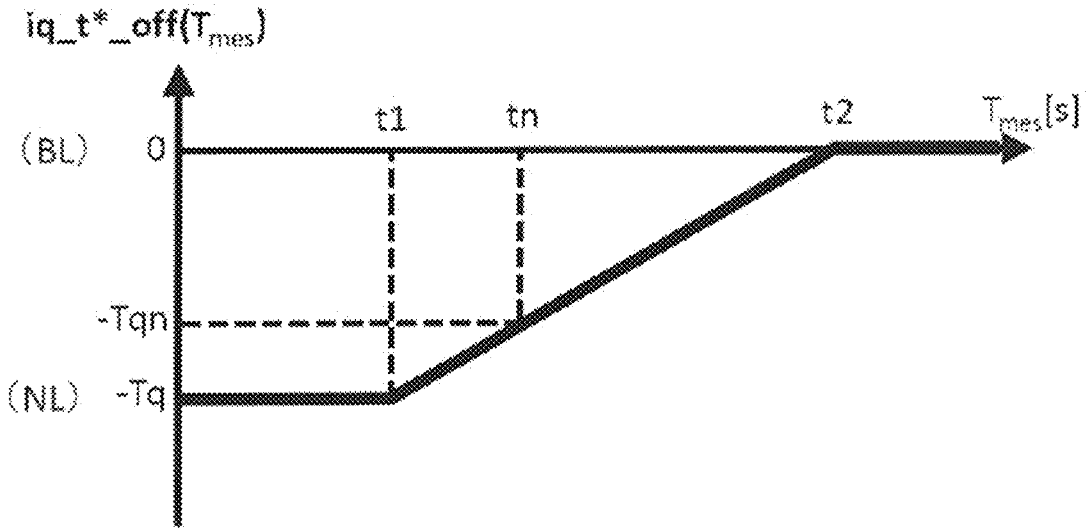
FIG. 6 is a graph for showing a correction torque function (to be used when the rotating direction is positive) which is an element forming the unbalance torque estimation unit in the elevator control device according to the first embodiment of the present invention.

FIG. 5 and FIG. 6 are each a graph for showing the correction torque function unit 174 which is an element forming the unbalance torque estimation unit 17 in the elevator control device according to the first embodiment of the present invention. Of those, FIG. 5 is a graph for showing the correction torque function unit 174 that is based on a correction torque function to be used when the rotating direction of the motor 31 is negative. Meanwhile, FIG. 6 is a graph for showing the correction torque function unit 174 that is based on a correction torque function to be used when the rotating direction of the motor 31 is positive.

Specifically, FIG. 5 and FIG. 6 are each a graph for showing the correction torque function to be computed in the correction torque function unit 174. As is apparent from FIG. and FIG. 6, the correction torque function represents a relationship of the unbalance torque estimation signal iq_t*_off(Tmes) corresponding to the measured first time period Tmes in the case in which the rotating direction of the motor 31 is negative.

In the correction torque function shown in FIG. 5, the horizontal axis indicates Tmes [s], the vertical axis indicates iq_t*_off(Tmes), the domain is 0 or more, and the range is from 0 to αTq. Meanwhile, in the correction torque function shown in FIG. 6, similarly to FIG. 5, the horizontal axis indicates Tmes [s], and the vertical axis indicates iq_t*_off (Tmes). The domain is zero or more, but the range is from −Tq to zero, and this point differs from FIG. 5. In this case, the symbols used in FIG. 5 and FIG. 6 have the same meanings as those used in the description of FIG. 3.

Details of the correction torque function shown in FIG. 5 are as follows. As shown in FIG. 5, a value of iq_t*_off (Tmes), which is a value of the correction torque function, is a constant value of αTq while Tmes is from zero to t3 [s], and reduces with a linear function characteristic while Tmes is from t3 to t2. The slope of the linear function at this time is −Tq/(t2−t1). The value of iq_t*_off(Tmes) when Tmes is t2 [s] is 0. Further, the value of iq_t*_off(Tmes) is defined as 0 even when Tmes is not less than t2 [s].

Meanwhile, details of the correction torque function shown in FIG. 6 are as follows. As shown in FIG. 6, the value of iq_t*_off(Tmes), which the value of the correction torque function, is a constant value of −Tq while Tmes is from zero to t1 [s], and increases with a linear function characteristic while Tmes is from t1 to t2. The value of iq_t*_off(Tmes) when Tmes is t2 [s] is zero. Further, the value of iq_t*_off(Tmes) is defined as zero even when Tmes is not less than t2 [s].

As a matter of fact, the characteristics of FIG. 5 and FIG. 6 described above are defined based on the contents described above and shown in FIG. 3. As described earlier, FIG. 3 is a graph for showing the relationship between the unbalance torque and the first time period Tmes. In FIG. 5 and FIG. 6, the vertical axis and the horizontal axis of FIG. 3 are exchanged, and further, the unbalance torque on the new vertical axis is defined as the unbalance torque estimation signal. Further, FIG. 5 shows a case in which the unbalance torque estimation signal is positive. Meanwhile, FIG. 6 shows a case in which the unbalance torque estimation signal is negative.

The unbalance torque can be estimated through use of the correction torque function computed in the correction torque function unit 174, which is shown in FIG. 5 or FIG. 6. That is, as a case in which the measured first time period Tmes is, for example, Tn [s], when the sign of the rotating direction information at this time is positive, the correction torque function shown in FIG. 6 is selected, and when the sign of the rotating direction information at this time is negative, the correction torque function shown in FIG. 5 is selected. As is apparent from the correspondence relationship of the correction torque function shown in the selected figure of FIG. 5 or FIG. 6, there can be obtained Tqn being a value of iq_t*_off(Tmes) corresponding to the time when Tmes is Tn [s]. As described above, Tqn being the value of iq_t*_off (Tmes) obtained when the first time period Tmes is Tn [s] can be estimated as the unbalance torque estimation signal.

Figure 8:
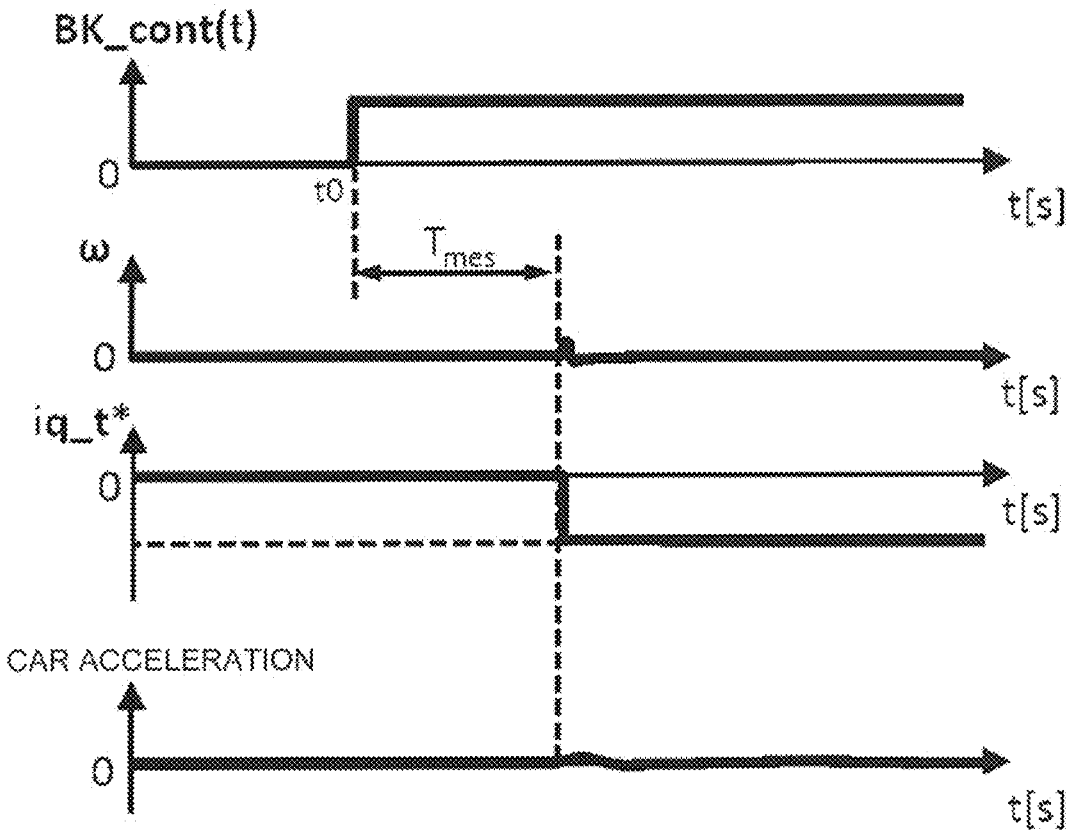
FIG. 8 shows time waveform charts of various signals in the elevator control device according to the first embodiment of the present invention.

FIG. 8 shows time waveform charts of various signals in the elevator control device according to the first embodiment of the present invention. FIG. 8 shows behaviors in a case in which there is no in-car load as an initial condition, and, as a result, a step disturbance caused by the unbalance torque is input to the motor 31. Contents described here are contents that we have verified by means of simulation and actual devices.

The four time waveforms of the various signals illustrated in FIG. 8 are, in order from the top, time waveforms related to the brake control signal BK_cont(t), the velocity signal ω(t), the torque current command signal iq_t*, and a vertical acceleration of the car 34. In particular, the behaviors of the various signals after the first time period Tmes [s] has elapsed from the time when the release command is output in response to the brake control signal BK_cont(t) are as follows. As is apparent from FIG. 8, the velocity signal ω(t) slightly varies, and then keeps zero. The torque current command signal iq_t* exhibits a stepped waveform, which represents that the unbalance torque is instantly and appropriately corrected. The vertical acceleration of the car 34 exhibits a waveform obtained by differentiating the velocity signal ω(t), and hence also slightly varies, and then keeps zero. It is understood from the result of the vertical acceleration of the car 34 that, according to the elevator control device of the first embodiment of the present invention, the start shock and the rollback can be suppressed to be extremely small even when the step disturbance caused by the unbalance torque is input to the motor 31.

The present invention is made in accordance with such a new finding obtained this time that the above-mentioned elevator control device according to the first embodiment of the present invention, in particular, the unbalance torque estimation unit 17 can estimate the unbalance torque based on the first time period from the output change of the brake state command signal for switching the operation state of the brake 36 from the braking state to the releasing state to the time when the motor 31 starts the rotating operation along with the release of the brake 36, and on the positive or negative sign of the velocity signal obtained when the motor 31 starts the rotation. In accordance with this new finding, in the elevator control device according to the first embodiment of the present invention, the unbalance torque estimation computation can be performed based on a correspondence relationship typified by a function having a simple characteristic, instead of performing computation by constructing a disturbance observer as in the related art. Thus, there can be provided such an effect that, as compared to the related art, a smaller calculation load of the computing means, for example, the microcomputer, can be achieved. Further, as described above, the torque current command signal iq_t* exhibits a stepped waveform, and thus the unbalance torque is instantly and appropriately corrected. Thus, with the configuration of the elevator control device according to the first embodiment of the present invention, there can be provided such an effect that the elevator control device can have a sufficient responsiveness for suppressing the influence of the unbalance torque.

Second Embodiment

The elevator control device according to the first embodiment of the present invention has a configuration effective with respect to a case in which, for example, the characteristic of the brake 36 is not greatly changed. In contrast, an elevator control device according to a second embodiment of the present invention is configured to suppress the start shock and the rollback to be small even when, while the elevator system is in operation, the characteristic of the brake 36 is changed by being affected by temperature or the like.

Figure 9:
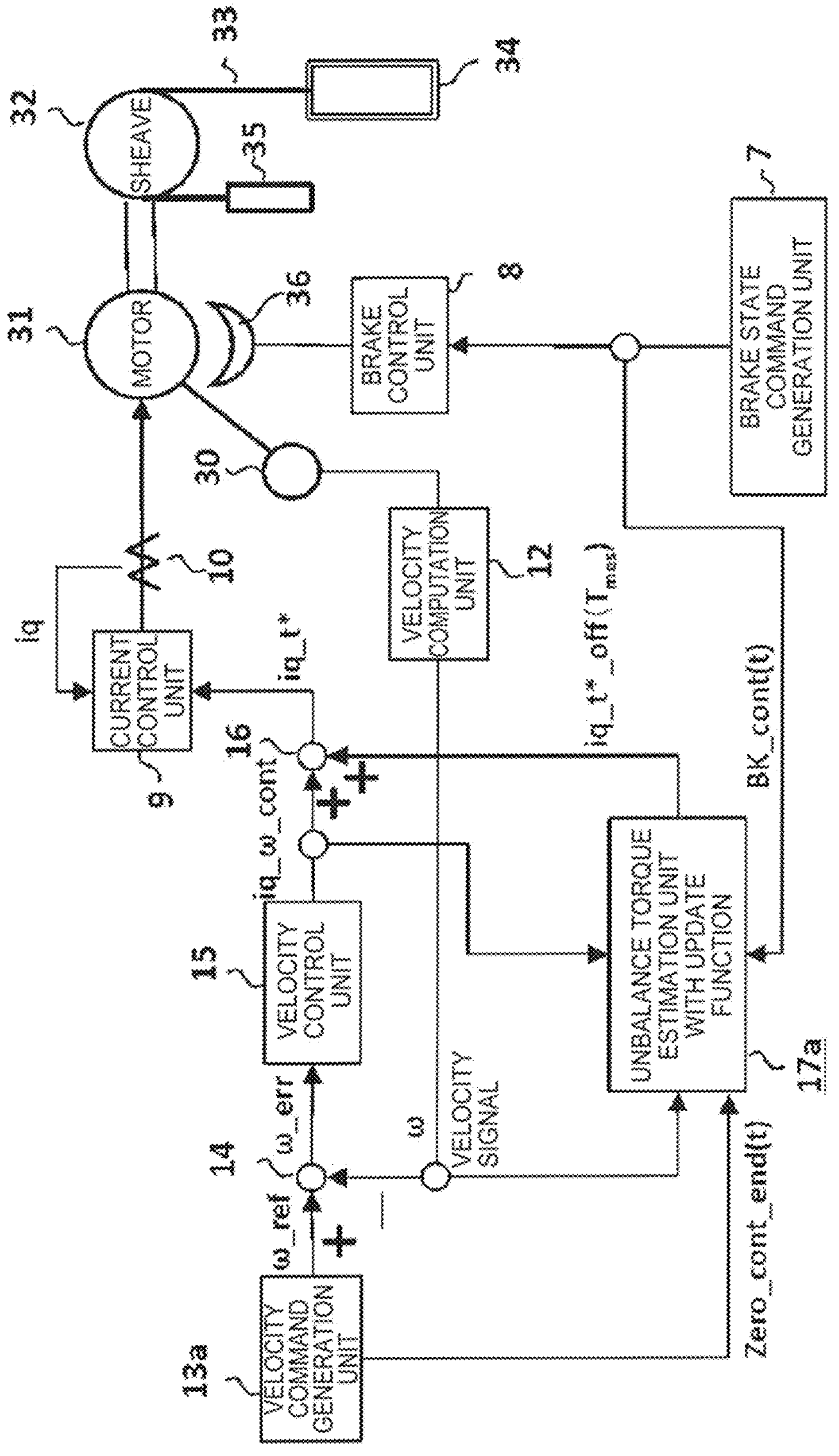
FIG. 9 is a diagram for illustrating an elevator control device according to a second embodiment of the present invention.

FIG. 9 is a diagram for illustrating the elevator control device according to the second embodiment of the present invention. The elevator control device according to the second embodiment of the present invention is directed to an elevator control device assuming a case in which the brake 36 has a characteristic change. In FIG. 9, a part of the unbalance torque estimation unit 17 in the first embodiment illustrated in FIG. 1 is replaced with an unbalance torque estimation unit 17*a* with an update function. Other configurations are the same as those of the elevator control device according to the first embodiment illustrated in FIG. 1. Accordingly, description is mainly given here of the unbalance torque estimation unit 17*a* with the update function being the changed part.

As illustrated in FIG. 9, the unbalance torque estimation unit 17*a* with the update function receives, as newly added input signals, the velocity control signal iq_ω_cont being the output of the velocity control unit 15, and a zero velocity control end timing signal Zero_cont_end(t) which can be obtained from the velocity command generation unit 13*a*. Those newly added signals are used to cope with the characteristic change of the brake 36, which becomes an issue of the elevator control device according to the embodiment of the present invention.

Figure 10:
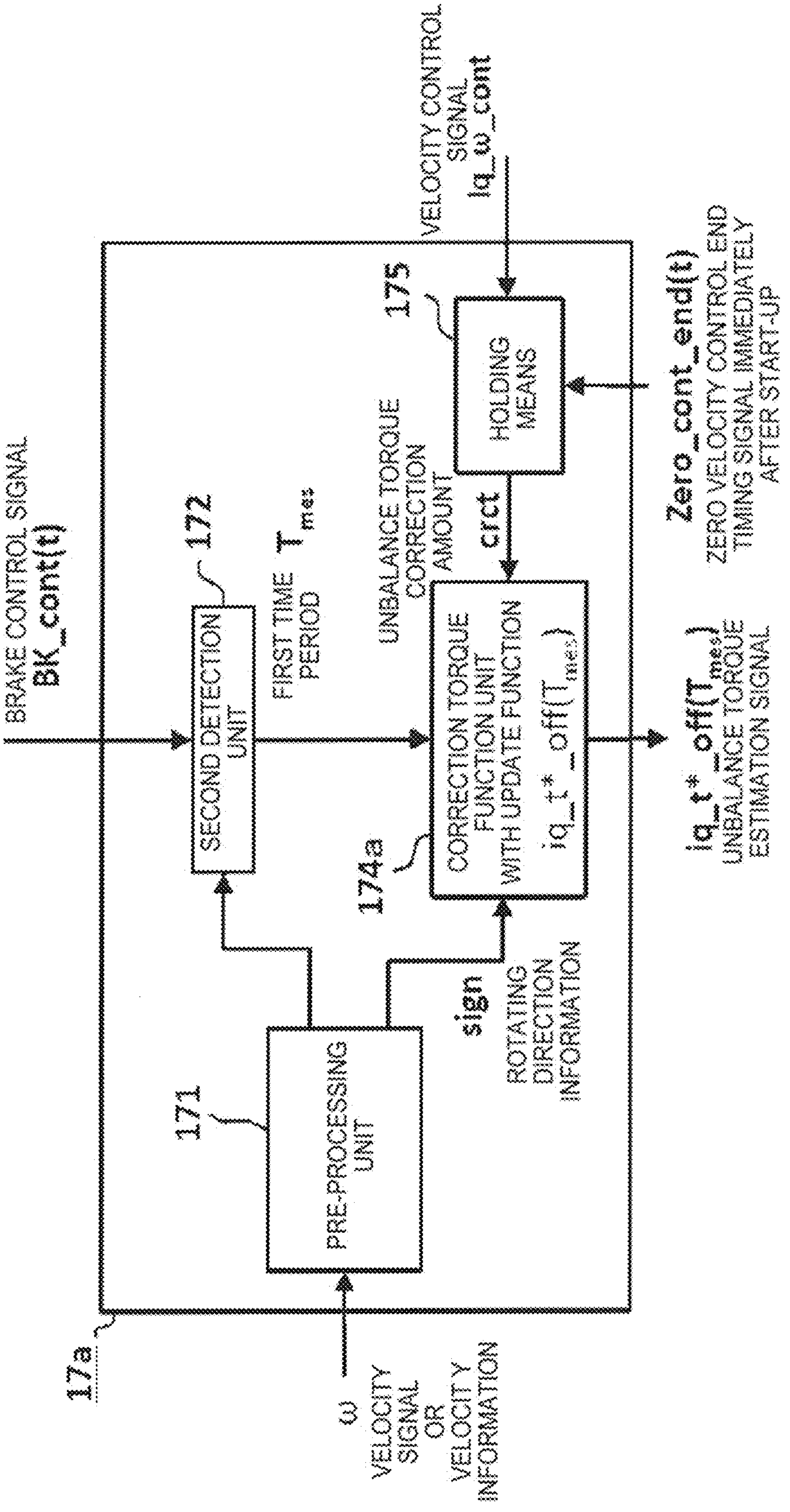
FIG. 10 is a configuration diagram of an unbalance torque estimation unit with an update function in the elevator control device according to the second embodiment of the present invention.

FIG. 10 is a configuration diagram of the unbalance torque estimation unit 17*a* with the update function in the elevator control device according to the second embodiment of the present invention, and is a block diagram for illustrating an example of the unbalance torque estimation unit 17*a* with the update function. In the configuration of the unbalance torque estimation unit 17*a* with the update function in the second embodiment illustrated in FIG. 10, two configurations of a correction torque function 174*a* with an update function and holding means 175 are different from the configuration of the unbalance torque estimation unit 17 in the first embodiment illustrated in FIG. 3.

FIG. 11 shows examples of time waveform charts of various signals obtained when the brake characteristic is changed in a case in which the unbalance torque is generated because the car 34 has no load therein and also a case in which suppression control for the start shock and the rollback is not performed. The five time waveforms of the various signals illustrated in FIG. 11 are, in order from the top, the brake control signal BK_cont(t), the velocity signal ω(t), the velocity control signal iq_ω_cont, the vertical acceleration of the car 34, and the zero velocity control end timing signal Zero_cont_end(t) immediately after the start-up.

The behaviors of the various signals after the first time period Tmes [s] has elapsed from the time when the release command is output in response to the brake control signal BK_cont(t) are as follows. As is apparent from FIG. 11, the velocity signal ω(t) and the velocity control signal iq_ω_cont are greatly disturbed. As a result, at least a large start shock is given to the car 34. In this case, similarly to the contents described in the first embodiment of the present invention as well, in the situation illustrated in FIG. 11, there is achieved zero velocity control of controlling the velocity of the motor with the velocity command signal being set to zero. Accordingly, as illustrated in FIG. 11, the velocity signal ω(t) converges to zero. Further, the velocity control signal iq_ω_cont converges to a value "crct" which can relatively be treated as a constant value.

In this case, the velocity control signal iq_ω_cont becomes zero when the unbalance torque estimation signal iq_t*_off(Tmes) can be accurately estimated. However, when the brake 36 has a characteristic change as assumed in the second embodiment, as illustrated in FIG. 11, the velocity control signal iq_ω_cont becomes the value "crct". That is, it can be understood that an error of "crct" is caused in the velocity control signal iq_ω_cont because the brake 36 has a characteristic change. In other words, the value "crct" can be considered to be a correction amount for compensating for the error in the velocity control signal iq_ω_cont. Accordingly, on and after the brake state change timing at which the operation state of the brake 36 changes from the static friction state to the dynamic friction state, "crct" being the detection value of the velocity control signal iq_ω_cont at the time when the velocity signal ω converges to zero through the zero velocity control can be used as the correction amount for the unbalance torque estimation signal iq_t*_off(Tmes). In order to put this way of thinking into practice, the holding means 175 illustrated in FIG. 10 is used.

Description has been given so far of an example in which, as the timing at which the velocity signal ω converges to zero through the zero velocity control, the zero velocity control end timing signal Zero_cont_end(t) which can be obtained from the velocity command generation unit 13*a* is used. However, instead of using the velocity command, the velocity signal ω can be used, to thereby use a signal obtained by determining whether or not the velocity signal ω has converged to the zero velocity.

Figure 12:
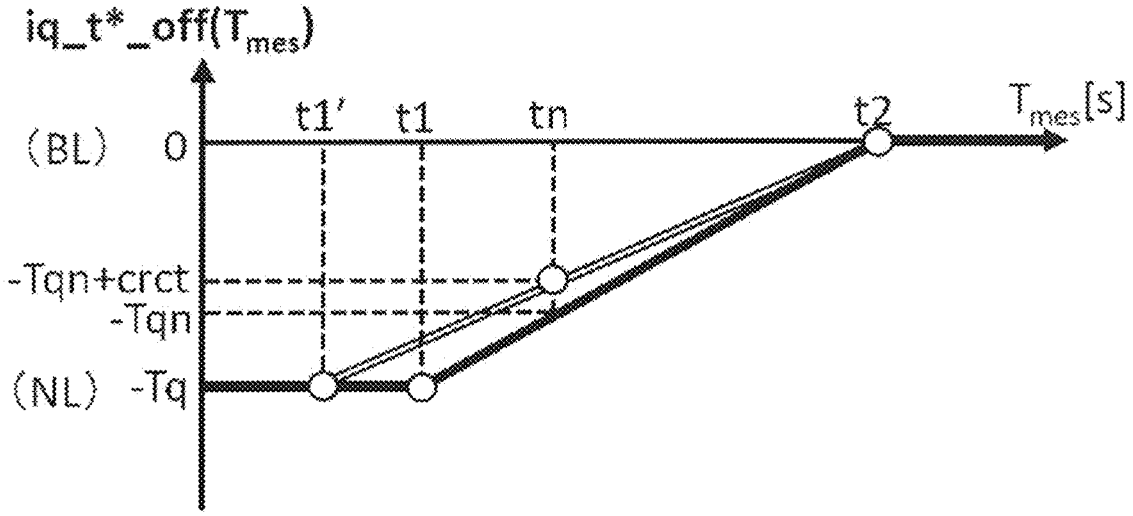
FIG. 12 is a graph as an example for showing an update operation for a correction torque function (to be used when the rotating direction is positive) which is an element forming the unbalance torque estimation unit with the update function in the elevator control device according to the second embodiment of the present invention.
Figure 13:
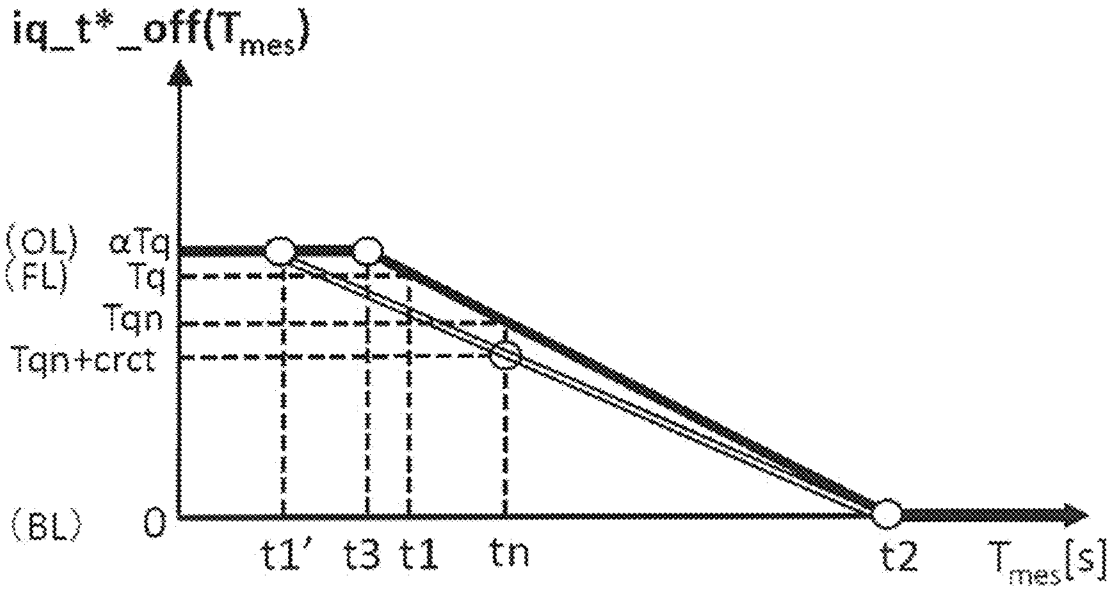
FIG. 13 is a graph as an example for showing an update operation for a correction torque function (to be used when the rotating direction is negative) which is an element forming the unbalance torque estimation unit with the update function in the elevator control device according to the second embodiment of the present invention.

FIG. 12 and FIG. 13 are each a graph for showing the correction torque function unit 174*a* with the update function, which is an element forming the unbalance torque estimation unit 17*a* with the update function in the elevator control device according to the second embodiment of the present invention. Of those, FIG. 12 is a graph for showing the correction torque function unit 174*a* with the update function that is based on a correction torque function to be used when the rotating direction of the motor 31 is positive. Meanwhile, FIG. 13 is a graph for showing the correction torque function unit 174*a* with the update function that is based on a correction torque function to be used when the rotating direction of the motor 31 is negative.

Now, with reference to FIG. 12 and FIG. 13, as a specific example, description is given of an update operation for the correction torque function in the correction torque function unit 174*a* with the update function.

First, description as a preparation is given below. Points of white circles of each of FIG. 12 and FIG. 13 indicate break points in the correction torque functions before the update. Through use of the correction torque function before the update having a characteristic determined by two points of white circles in each of FIG. 12 and FIG. 13, there is considered a case in which the suppression control for the start shock and the rollback is executed by the elevator control device according to the first embodiment of the present invention. At this time, it is assumed that, when the measured value of the first time period Tmes is "tn", as described so far, "crct" has been detected as the correction amount for the unbalance torque estimation signal iq_t*_off (Tmes), which is required along with the characteristic change of the brake 36 or the like. In the velocity control in the subsequent next car raising/lowering operation, such an update that an amount corresponding to "crct" is added to the correction torque function is performed, thereby taking measures to prevent deterioration of suppression performance for the start shock or the rollback along with the characteristic change of the brake 36 or the like.

Further, the specific update operation for the correction torque function in the correction torque function unit 174*a* with the update function is as follows. In the example here, in order to facilitate the understanding, first, it is assumed that t2 being a point in the correction torque function shown in FIG. 12 and FIG. 13 does not change.

As described so far, when the sign of the velocity signal obtained when the motor 31 starts the rotating operation along with the release of the brake 36, that is, the rotating direction of the motor 31, is positive, the correction torque function shown in FIG. 12 is used. When the sign is negative, FIG. 12 referred to below may be replaced with FIG. 13.

In this case, as the update operation, first, in the correction torque function shown in FIG. 12, there is first obtained a point of a black circle of break point coordinates (t1', −Tq), which is obtained by connecting a point of a white circle having coordinates (t2, 0) and a point of a black circle having coordinates (tn, −Tqn+crct) with a straight line. Next, a correction torque function obtained by connecting the thus-obtained point of the black circle having the break point coordinates (t1', −Tq) and the point of the white circle having the coordinates (t2, 0) with a straight line is updated as a new correction torque function.

With such an update operation being achieved, even when the characteristic of the brake 36 is changed by being affected by temperature or the like, the value "crct" in the subsequent next car raising/lowering operation may be set to zero. Unless the characteristic of the brake 36 abruptly changes in a short period of time, the update operation for the correction torque function in the correction torque function unit 174*a* with the update function can be repeated so that, even when the characteristic of the brake 36 changes, the unbalance torque is accurately estimated, and, as a result, the start shock and the rollback can be suppressed to be small.

Description has been given so far of the update operation for the correction torque function in the correction torque function unit 174*a* with the update function assuming that, even after the update, t2 being a point in the correction torque function does not change as before the update.

However, in an actual case, it cannot be said that t2 being a point in the correction torque function does not always change in the correction torque function after the update. That is, the actual correction torque function representing the relationship between the unbalance torque and the first time period Tmes does not always pass through the coordinates (t2, 0).

However, even when the actual correction torque function does not always pass through the coordinates (t2, 0), in the elevator control device according to the second embodiment of the present invention, the update operation for the correction torque function in the correction torque function unit 174*a* with the update function does not have a big problem even when being based on the assumption that t2 being a point in the correction torque function does not change before and after the update.

The reason therefor is because, even when a correction torque function value in the vicinity of t2 has a modeling error, the influence of the value of the modeling error in the vicinity of t2 on the correction torque function value in the vicinity of t2 is still smaller as compared to the influence of the value of the modeling error in the vicinity of t2 on, for example, the correction torque function value at the time when the measured value of the first time period Tmes is "tn". That is, the value of the modeling error in the vicinity of t2 is small in degree of influence on the suppression effect for the start shock or the rollback as an error with respect to an estimation value of the unbalance torque amount. In short, when a case in which Tmes on the horizontal axis is in the vicinity of t2 and a case in which Tmes on the horizontal axis is "tn" are compared to each other, the absolute value of the estimation value of the unbalance torque amount is relatively smaller in the former case, and is larger in the latter case. Accordingly, it can be said that the value of the modeling error in the vicinity of t2 has a smaller influence in the latter case as compared to the former case.

In this case, FIG. 10 is a configuration diagram of the unbalance torque estimation unit 17*a* with the update function in the elevator control device according to the second embodiment of the present invention, and hence it is difficult to understand from FIG. 10 an operation sequence over time. Specifically, it is difficult to understand the update operation sequence for the correction function in the correction torque function unit 174*a* with the update function. In view of the above, in the following, as a reference, description is given with reference to FIG. 14 of the update operation sequence for the correction function in the correction torque function unit 174*a* with the update function, regarding the elevator control device according to the second embodiment of the present invention.

Figure 14:
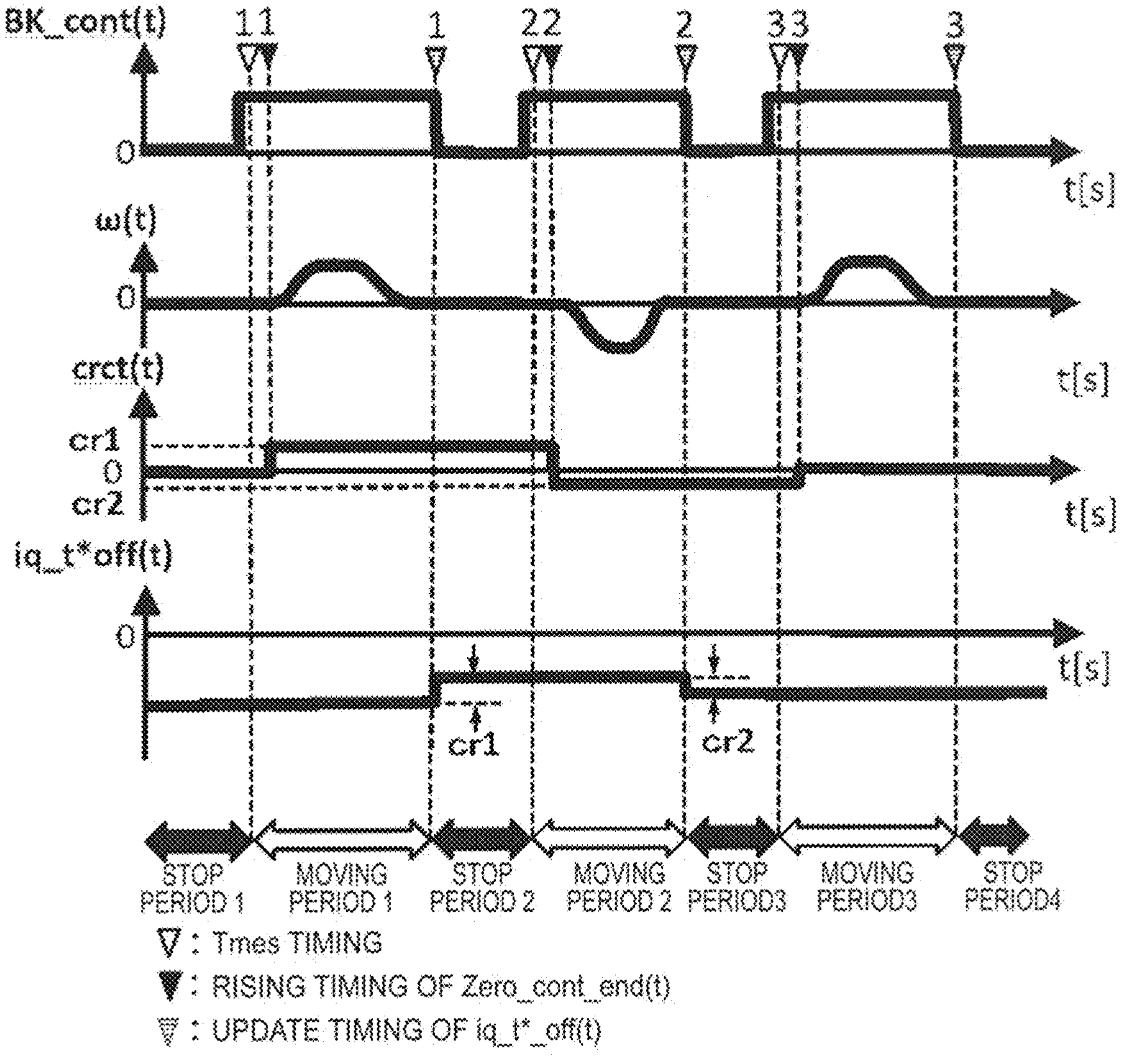
FIG. 14 shows charts for illustrating an update operation sequence of the unbalance torque estimation unit with the update function in the elevator control device according to the second embodiment of the present invention.

FIG. 14 shows time-axis waveform charts for allowing understanding of processing timings of various signals in a case in which the car 34 of the elevator is operated to be raised and lowered in the elevator control device according to the second embodiment of the present invention.

The four time waveforms of the various signals illustrated in FIG. 14 are, in order from the top, time waveforms related to the brake control signal BK_cont(t), the velocity signal ω(t), the unbalance torque correction amount crct(t), and the unbalance torque estimation signal iq_t*_off(t).

Above those time waveforms, major timings are shown through use of triangular marks as symbols. Above the triangular marks, numbers are assigned in order from the earliest in the time axis. Those numbers correspond to the numbers assigned to moving periods. That is, when a number 1 is assigned above a triangular mark, it is understood that the triangular mark indicates a major timing related to a moving period 1. White triangular marks indicate timings of the first time period Tmes, and each indicate the timing at which the first time period Tmes has elapsed from the rising of BK_cont(t). Black triangular marks each indicate the rising timing of Zero_cont_end(t) being the zero velocity control end timing signal immediately after the start-up. Triangular marks with horizontal lines each indicate the update timing of the unbalance torque estimation signal iq_t*_off(t).

Further, in a lower portion of FIG. 14, the operation state of the elevator is shown through use of horizontal arrows. Further, below the horizontal arrows, names of the operation state are shown. Black horizontal arrows each indicate a stop period which is a period of a state in which the elevator is stopped. In this example, the stop period is defined as a period from the triangular mark with horizontal lines to the white triangular mark. White horizontal arrows each indicate a moving period which is a period of a state in which the car 34 is operated and moved. In this example, the moving period is defined as a period from the white triangular mark to the triangular mark with horizontal lines.

In this case, as the operation of the car 34, the car 34 is stopped in a stop period 1, moved to an upper floor in a moving period 1, stopped in a stop period 2, moved to a lower floor in a moving period 2, stopped in a stop period 3, moved to an upper floor in a moving period 3, and stopped in a stop period 4.

In this case, in order to simplify the description, there is assumed a case in which no passenger gets on or off during the series of operations so that there is no change in in-car load, and, during the stop period, the brake 36 has some change in characteristic with time.

The correction operation for the unbalance torque estimation signal iq_t*_off(t) in the second embodiment is as follows. With reference to FIG. 10, the operation of FIG. 14 is described.

First, at the timing of the black triangular mark 1, the velocity control signal iq_ω_cont(t) is held in the holding means 175, and the unbalance torque correction amount "crct" is measured. The measured value "crct" in this case is cr1. The value "crct" is input to the correction torque function unit 174*a* with the update function. The correction torque function unit 174*a* with the update function updates the correction torque function based on "crct", but this update operation is performed during the stop period 2. In the example of FIG. 14, the update is performed at the timing of the start of the stop period 2, but, needless to say, the update may be performed at any timing during the stop period 2. As a result, the unbalance torque estimation signal iq_t*_off(t) after the update is a value obtained by adding cr1 to the value before the correction.

Similarly, after the operation transitions from the stopped state in the stop period 2 to the moving period 2, at the timing of the black triangular mark 2, the velocity control signal iq_ω_cont(t) is held in the holding means 175, and the unbalance torque correction amount "crct" is measured. The measured value "crct" in this case is cr2. In this example, the sign of cr2 is negative. Similarly, "crct" is input to the correction torque function unit 174*a* with the update function, and the correction torque function is updated at any timing in the stop period 3. As a result, the unbalance torque estimation signal iq_t*_off(t) after the update is a value obtained by adding cr2 to the value before the correction. The sign of cr2 in this example is negative, and hence the unbalance torque estimation signal iq_t*_off(t) after the update is a value obtained by subtracting an amount corresponding to the amplitude of cr2 from the value before the correction.

Further, similarly, after the operation transitions from the stopped state in the stop period 3 to the moving period 3, at the timing of the black triangular mark 3, the velocity control signal iq_ω_cont(t) is held in the holding means 175, and the unbalance torque correction amount "crct" is measured. The measured value "crct" in this case is zero. At this time, there is assumed a case in which the brake 36 has no change in characteristic, and hence, as a result, the measured value of the unbalance torque correction amount "crct" is zero. Similarly, "crct" is input to the correction torque function unit 174*a* with the update function, and the correction torque function is updated at any timing in the stop period 3, but, as a result, the unbalance torque estimation signal iq_t*_off(t) after the update is the same value as the value before the update.

Here, as a reference, description has been given with reference to FIG. 14 of the update operation sequence for the correction torque function, regarding the elevator control device according to the second embodiment of the present invention.

According to the elevator control device of the second embodiment of the present invention described above, even when the characteristic of the brake 36 is changed by being affected by temperature or the like while the elevator system is in operation, through use of the unbalance torque estimation unit 17*a* with the update function in place of the balance torque estimation unit 17 in the configuration of the elevator control device according to the first embodiment of the present invention, the unbalance torque estimation unit 17*a* with the update function can appropriately update the correction torque function for estimating the unbalance torque as the unbalance torque estimation signal. As a result, the start shock and the rollback can be suppressed to be small.

As a matter of course, with the elevator control device according to the second embodiment of the present invention, similarly to the elevator control device according to the first embodiment of the present invention, the unbalance torque estimation computation can be performed based on a correspondence relationship typified by a function having a simple characteristic, instead of performing computation by constructing a disturbance observer as in the related art. Thus, there can be provided such an effect that, as compared to the related art, a smaller calculation load of the computing means, for example, the microcomputer, can be achieved. Further, the torque current command signal iq_t* exhibits a stepped waveform, and thus the unbalance torque is instantly and appropriately corrected. Thus, with the configuration of the elevator control device according to the second embodiment of the present invention, similarly to the elevator control device according to the first embodiment of the present invention, there can be provided such an effect that the elevator control device can have a sufficient responsiveness for suppressing the influence of the unbalance torque.

REFERENCE SIGNS LIST

7 brake state command generation unit, 8 brake control unit, 9 current control unit, 10 current detection unit, velocity computation unit, 13, 13*a* velocity command generation unit, 14 subtraction unit, 15 velocity control unit, addition unit, 17 unbalance torque estimation unit, 17*a* unbalance torque estimation unit with an update function, 30 encoder, 31 motor, 32 sheave, 33 rope (including a rope having a belt shape), 34 car, 35 counterweight, 36 brake, 171 pre-processing unit, 172 second detection unit, 174 correction torque function unit, 174*a* correction torque function unit with an update function

The invention claimed is:

1. An elevator control device for reducing abrupt state variations in a car of an elevator, comprising:

a current detecting circuitry to detect a drive current of a motor configured to drive a sheave to rotate, the sheave having a rope looped therearound, the rope suspending, on one side and the other side thereof, the car and a counterweight, respectively, through intermediation of the sheave;

a velocity computing circuitry to compute a velocity signal of the motor based on output of a rotation amount detecting circuitry to detect a rotation amount of the motor, the rotation amount detecting circuitry including an encoder connected to the motor;

a velocity command generating circuitry to generate a velocity command signal for the motor;

a velocity controlling circuitry to output, based on the velocity command signal and the velocity signal, a velocity control signal so that the velocity signal follows the velocity command signal, to thereby control a velocity of the motor;

a current controlling circuitry to drive the motor so that the drive current follows a torque current command signal input thereto;

a brake controlling circuitry to control switching between a releasing state and a braking state of a brake configured to brake a rotation of the motor;

a brake state command generating circuitry to output, to the brake controlling circuitry, a brake state command signal for switching between the releasing state and the braking state of the brake; and an unbalance torque estimating circuitry to estimate an unbalance torque in the motor caused by a weight difference between the car and the counterweight based on a first time period from an output change of the brake state command signal for switching an operation state of the brake from the braking state to the releasing state to a time when the motor starts a rotating operation along with release of the brake, and a positive or negative sign of the velocity signal obtained when the motor starts the rotating operation, and to output an unbalance torque estimation signal being an estimation result, wherein the unbalance torque estimating circuitry receives the brake state command signal and the speed signal as inputs, measures the first time period based on the brake state command signal and the speed signal, determines whether the sign of the unbalance torque is positive or negative based on a positive or negative sign of the velocity signal obtained when the motor starts the rotating operation, and estimates the unbalance torque from the first time period and a positive or negative sign of the unbalance torque, and outputs the unbalance torque estimation signal.

2. The elevator control device according to claim 1, wherein the unbalance torque estimating circuitry is configured to use, as the unbalance torque estimation signal, an unbalance torque amount associated with the first time period by a determined correction torque function.

3. The elevator control device according to claim 2, wherein the correction torque function is determined in accordance with the positive or negative sign of the velocity signal obtained when the motor starts the rotating operation along with the release of the brake.

4. The elevator control device according to claim 2, further comprising:

an adding circuitry to output, to the current controlling circuitry, a torque current command signal corrected by adding the unbalance torque estimation signal to the velocity control signal which is output from the velocity controlling circuitry; and a holding circuitry to hold, as a holding value, the velocity control signal at a time when the velocity signal converges to zero, as a control result obtained through the zero velocity control of controlling the velocity of the motor with the velocity command signal being set to zero, the zero velocity control being based on output of the adding circuitry to the current controlling circuitry, wherein the unbalance torque estimation signal is corrected by adding the holding value to the unbalance torque amount associated with the first time period by the correction torque function used in the unbalance torque estimating circuitry.

5. The elevator control device according to claim 3, further comprising:

an adding circuitry to output, to the current controlling circuitry, a torque current command signal corrected by adding the unbalance torque estimation signal to the velocity control signal which is output from the velocity controlling circuitry; and a holding circuitry to hold, as a holding value, the velocity control signal at a time when the velocity signal converges to zero, as a control result obtained through the zero velocity control of controlling the velocity of the motor with the velocity command signal being set to zero, the zero velocity control being based on output of the adding circuitry to the current controlling circuitry, wherein the unbalance torque estimation signal is corrected by adding the holding value to the unbalance torque amount associated with the first time period by the correction torque function used in the unbalance torque estimating circuitry.

6. The elevator control device according to claim 4, wherein the correction torque function is updated through use of a correction result of the unbalance torque estimation signal.

7. The elevator control device according to claim 5, wherein the correction torque function is updated through use of a correction result of the unbalance torque estimation signal.

8. The elevator control device according to claim 2, wherein, in the correction torque function, the first time period and the unbalance torque amount are associated with each other so that an absolute value of the unbalance torque amount is decreased as the first time period is increased.

9. The elevator control device according to claim 3, wherein, in the correction torque function, the first time period and the unbalance torque amount are associated with each other so that an absolute value of the unbalance torque amount is decreased as the first time period is increased.

10. The elevator control device according to claim 4, wherein, in the correction torque function, the first time period and the unbalance torque amount are associated with each other so that an absolute value of the unbalance torque amount is decreased as the first time period is increased.

11. The elevator control device according to claim 5, wherein, in the correction torque function, the first time period and the unbalance torque amount are associated with each other so that an absolute value of the unbalance torque amount is decreased as the first time period is increased.

12. The elevator control device according to claim 6, wherein, in the correction torque function, the first time period and the unbalance torque amount are associated with each other so that an absolute value of the unbalance torque amount is decreased as the first time period is increased.

13. The elevator control device according to claim 7, wherein, in the correction torque function, the first time period and the unbalance torque amount are associated with each other so that an absolute value of the unbalance torque amount is decreased as the first time period is increased.

14. The elevator control device according to claim 1, wherein determination on timing at which the motor starts the rotating operation, which is required for specifying the first time period, is performed based on a time when a change indicating the rotating operation of the motor appears in at least one of the velocity signal, an output signal of the rotation amount detecting circuitry, the velocity control signal, the drive current, or the torque current command signal.

15. The elevator control device according to claim 2, wherein determination on timing at which the motor starts the rotating operation, which is required for specifying the first time period, is performed based on a time when a change indicating the rotating operation of the motor appears in at least one of the velocity signal, an output signal of the rotation amount detecting circuitry, the velocity control signal, the drive current, or the torque current command signal.

16. The elevator control device according to claim 3, wherein determination on timing at which the motor starts the rotating operation, which is required for specifying the first time period, is performed based on a time when a change indicating the rotating operation of the motor appears in at least one of the velocity signal, an output signal of the rotation amount detecting circuitry, the velocity control signal, the drive current, or the torque current command signal.

* * * * *